(12) United States Patent
Fu et al.

(10) Patent No.: US 11,194,825 B2
(45) Date of Patent: Dec. 7, 2021

(54) DISTRIBUTED SEQUENTIAL PATTERN DATA MINING FRAMEWORK

(71) Applicant: MICROSOFT TECHNOLOGY LICENSING, LLC., Redmond, WA (US)

(72) Inventors: Shengyu Fu, Redmond, WA (US); Sai Tulasi Neppali, Hyderabad (IN); Neelakantan Sundaresan, Bellevue, WA (US); Siyu Yang, Redmond, WA (US)

(73) Assignee: MICROSOFT TECHNOLOGY LICENSING, LLC., Redmond, WA (US)

(*) Notice: Subject to any disclaimer, the term of this patent is extended or adjusted under 35 U.S.C. 154(b) by 385 days.

(21) Appl. No.: 16/139,075

(22) Filed: Sep. 23, 2018

(65) Prior Publication Data
US 2020/0097589 A1 Mar. 26, 2020

(51) Int. Cl.
G06F 16/2458 (2019.01)
G06F 17/18 (2006.01)

(52) U.S. Cl.
CPC ......... *G06F 16/2465* (2019.01); *G06F 17/18* (2013.01)

(58) Field of Classification Search
CPC .................................................. G06F 16/2465
See application file for complete search history.

(56) References Cited

U.S. PATENT DOCUMENTS

| | | | | |
|---|---|---|---|---|
| 8,645,138 B1* | 2/2014 | Weinstein | ............... | G10L 15/19 704/251 |
| 9,032,321 B1* | 5/2015 | Cohen | .................. | G06F 3/0488 715/771 |
| 10,397,368 B2* | 8/2019 | Cherubini | .............. | G06N 7/005 |
| 2003/0093762 A1* | 5/2003 | Rietman | ............. | G05B 13/027 700/97 |
| 2005/0234688 A1* | 10/2005 | Pinto | ...................... | G05B 17/02 703/6 |
| 2008/0133716 A1* | 6/2008 | Rao | ......................... | H04L 67/02 709/220 |
| 2013/0110758 A1* | 5/2013 | Jung | ...................... | G06N 20/00 706/47 |
| 2013/0346447 A1* | 12/2013 | Wu | ........................ | G06F 16/955 707/776 |
| 2015/0217198 A1* | 8/2015 | Curtis | ................. | G06F 11/3696 463/31 |
| 2016/0189049 A1 | 6/2016 | Silvestri et al. | | |
| 2018/0293502 A1* | 10/2018 | Sengupta | ............... | G06Q 30/01 |
| 2019/0005020 A1* | 1/2019 | Gregory | ................ | G06F 40/295 |
| 2020/0019893 A1* | 1/2020 | Lu | .......................... | G06N 5/025 |
| 2020/0168294 A1* | 5/2020 | Prochownik | ........... | G16B 20/00 |

OTHER PUBLICATIONS

"International Search Report and Written Opinion Issued in PCT Application No. PCT/US19/039667", dated Sep. 10, 2019, 12 Pages.

* cited by examiner

*Primary Examiner* — Richard L Bowen

(57) ABSTRACT

A distributed sequential pattern data mining framework mines user data to determine statistically-relevant sequential patterns which are used to correlate the sequential patterns to a particular outcome. The correlation is provided by a statistical model, a binary predictive model and/or a logistic regression model which uses the sequential patterns to learn the behavior of end users during their usage of a software application.

16 Claims, 8 Drawing Sheets

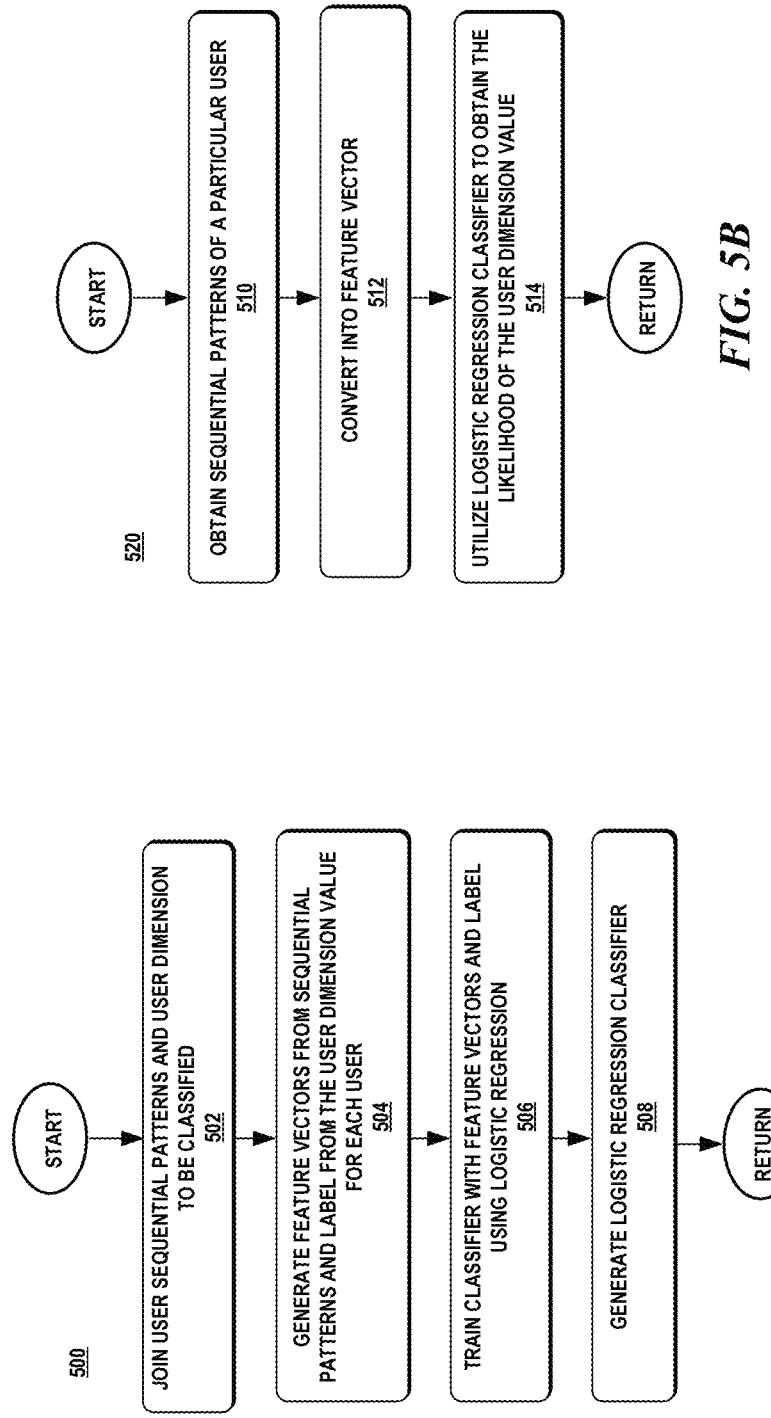

DISTRIBUTED SEQUENTIAL PATTERN DATA MINING FRAMEWORK

BACKGROUND

The evolution of computing has evolved significantly over the past decades making it possible to collect large volumes of data. The increases in computing power and digital storage has enabled the persistence and processing of large volumes of data. Organizations and companies store and analyze large amounts of data to improve their customer's experience, business decisions and processes. The volume of the collected data makes it impossible for human beings to perform an analysis of the data thereby leading to the development of data mining.

Data mining relates to the process of exploring large volumes of data to discover meaningful information about the data which can be in the form of relationships, patterns, and rules. Various analyses can be made on the data to discover relationships for an intended scenario or business objective. Various problems and challenges are presented when operating on large data such as huge memory and processor consumption, low processing speed and inadequate storage. In order for data mining to be effective at extracting useful information from large amounts of data, it has to overcome these problems and be efficient and scalable.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A distributed sequential pattern data mining framework provides capabilities to mine large volumes of data in a distributed manner in order to detect statistically-relevant sequential patterns of events. The sequential patterns represent a user's behavior during usage of a software application. The framework provides tools that utilize the sequential patterns to learn the behavior of the users' usage with the software application which include statistics-based models, binary predictive models, logistic regression models, and multi-nominal regression models. These models are used to associate particular sequential patterns with an outcome which can be used to improve the usage of the software application by its users.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF DRAWINGS

FIG. 5A is a flow diagram illustrating an exemplary method for training a logistic regression classifier and FIG. 5B is a flow diagram illustrating an exemplary method of the logistic regression classifier in predicting an outcome for a target sequential pattern associated with a binary-valued user dimension.

DETAILED DESCRIPTION

Overview

Figure 1:
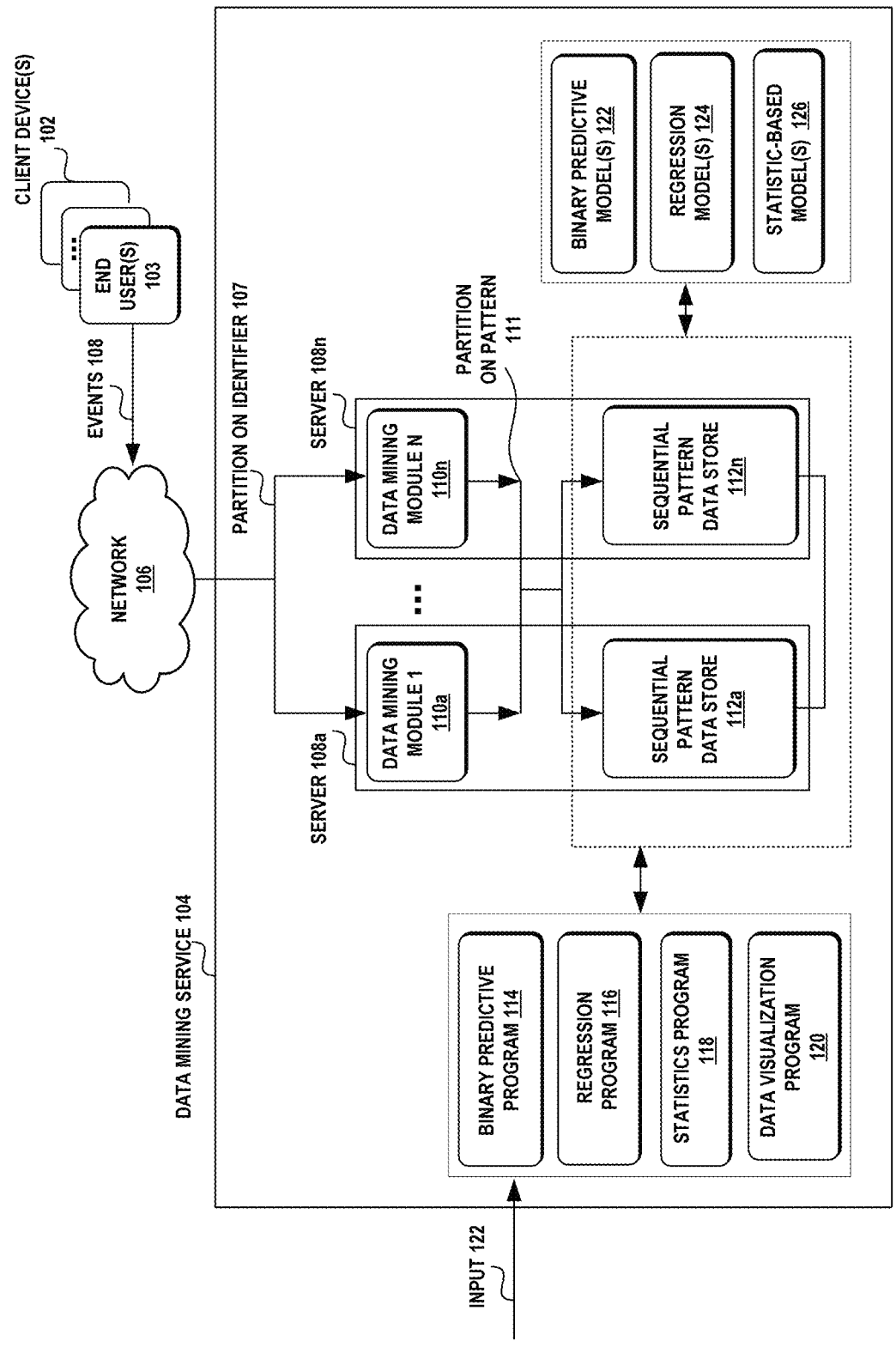
FIG. 1 illustrates an exemplary system of a distributed sequential pattern data mining framework.

The subject matter presented herein discloses a distributed sequential pattern data mining framework that mines user data to determine statistically-relevant sequential patterns which are used to correlate the sequential patterns to a particular outcome. In one aspect of the disclosure, the sequential patterns are used to learn the behavior of users of a software product and/or web-based service. The framework includes data mining operations that extract sequential patterns from a large volume of data and analysis operations that use the sequential patterns to generate statistical models to understand the performance of the product or service, to predict the behavior of the product or service, and to improve the product or service.

Large volumes of product telemetry data are processed by the distributed sequential pattern data mining framework. Product telemetry data is generated when a user of a software product or web-based service performs certain actions with the software product or service. The product telemetry data is embodied in an event. An event is an action triggered by the user or the system in response to an action taken by the user during usage of the software product or service. An event is associated with an event type which is a classification of an event.

An event type may represent a feature of the product or service. A feature is a unit of functionality that satisfies a requirement, a design decision and provides a configuration option. A feature emerges from the structure and behavior of the product or service in the form of the software's observable behavior. Examples of an event type in the context of a software product include launching a software program, installing the software program, using a code editor, refactoring a method, and so forth. An event has one or more event dimensions which provide additional information or characteristics about an event, such as the duration of the event, event status (e.g., success or failure of the event), location (e.g., country, state, city), product version (e.g., Visual Studio 2017 15.9.0 Preview 3), version of the operating system (e.g., Windows 10), etc.

Events are associated with a source referred to as an identifier. The identifier is used to identify the source of the action that triggered an event. The identifier may represent a user, session, or entity (i.e., organization, business) associated with usage of the product or service. The identifier is associated with user dimensions. A user dimension is a characteristic of an identifier. For example, in the case where the identifier is the user identifier, a user dimension may include the location of the user (i.e., GPS coordinates, country, state), the version of software product (i.e., commercial, enterprise, professional), status of the user (i.e., churn, active), the user's experience level (i.e., beginner, advanced) and so forth. Hence, an event is an instance of an event type that is triggered directly or indirectly by a source identified by an identifier.

The software product or service initiates an event upon occurrence of the user's action which is captured by a product telemetry tool. These events are then transmitted to a data mining service which then partitions the event by forwarding the event to a particular server based on the identifier of the event. The event is processed by a data mining module which generates all possible event sequences associated with a particular identifier. The event sequences generated by all the servers are then partitioned by pattern and stored in a select sever in the data mining service.

The framework is then used to perform various types of evaluations through the creation of various models. A statistical model generates statistics on the usage of a sequential pattern and other attributes associated with the sequential pattern. The binary predictive model generates an odds ratio for a particular sequential pattern relative to a target user dimension that has a binary value. The odds ratio is used to associate a particular sequential pattern to an outcome. The regression model generates a binary logistic regression classification model and a multi-nominal regression classification model. The binary logistic regression classification model is trained on sequential patterns associated with a binary-valued user dimension and are used to predict the probability that a particular sequential pattern is likely to produce the outcome associated with a user dimension. The multi-nominal regression classification model is trained with sequential patterns having a set of categorical values and predicts for a given sequential pattern the probability of a given pattern generating a select categorical value.

Attention now turns to a more detailed description of this system.

Distributed Sequential Pattern Data Mining Framework

Turning to FIG. 1, there is shown an exemplary system 100 embodying a distributed sequential pattern data mining framework. The system 100 includes one or more client devices 102, associated with end users 103, communicatively coupled to a data mining service 104 through a network 106.

Due to the large volume of events generated by the end users 103, the event data is distributed to one of multiple servers 108a-108n based on an identifier 107. The identifier may be a user identifier, a session identifier, or an identifier associated with a particular entity or organization. Event data associated with a particular identifier is routed to a particular server associated with the identifier. Each server performs the same data mining operations for the event data associated with a particular set of identifiers. The data mining operations are distributed across multiple servers in order to reduce the amount of data processing resources and time consumed by the data mining process thereby improving efficiency and scalability of the data mining framework.

In one aspect, the distributed sequential pattern data mining framework is a data mining service 104 implemented as a cloud service that performs data mining operations on data from end users of a product or service in order to discover sequential patterns indicative of the user's behavior. The data mining service 104 can be implemented as a distributed computing system with multiple components that run on multiple networked computers that operate as a single system. The data mining service 104 receives events from multiple end user's (i.e., customer, client, user, developer, etc.) 103 during their engagement with the product under evaluation and user data. The event includes an identifier, an event type, a timestamp, and one or more event dimensions, <event, identifier, event type, timestamp, $edim_1$, ..., $edim_n$>. The user data includes the identifier and one or more user dimensions, <identifier, $udim_1$, ..., $udim_n$>.

The data mining service 104 also includes a binary predictive program 114, a regression program 116, a statistics program 118, and a data visualization program 120. The binary predictive program 114 generates a binary predictive model 122 the computes an odds ratio for a particular sequential pattern relative to a target user dimension that has a binary value. The odds ratio is a measure of association between an exposure and an outcome. The exposure is the sequential pattern and the outcome is the user dimension having a particular binary value. The odds ratio is used to compare the relative odds of the occurrence of a particular outcome, the user dimension having a particular binary value, given a particular sequence of events represented by a particular sequential pattern. For example, given a user dimension representing a system crash (e.g., user dimension=crash) with a binary value representing the crash (e.g. crash=1), the odds ratio for a sequential pattern for those users having experienced a crash and not having experience a crash is calculated. The odds ratio associated with the sequential pattern is then used to determine whether the events in the sequential pattern are a risk factor for a crash and to compare the magnitude of the risk factor as a predictor of a crash.

The regression program 116 trains one or more regression models 124 such as a binary logistic regression classification model and/or a multi-nominal regression classification model from the sequential patterns. The binary logistic regression classification model is trained on sequential patterns associated with a particular binary-valued user dimension. The multi-nominal regression classification model is trained on sequential patterns associated with multi-valued categories associated with a user dimension. The binary logistic regression classification model is used to estimate a binary response based on the binary values of the user dimension and the multi-nominal regression classification model is used to estimate a categorical response based on multiple values of the user dimensions.

The statistics program 114 generates statistic-based models 126 on each sequential pattern across all the end users. In one aspect, the statistics program 114 generates a vector, $p_k$, for each sequential pattern k that contains statistics on a sequential pattern $p_k$ aggregated across all users. The vector may be represented mathematically as follows:

$p_k = <s_k, u_k, c_k, t_0, t_1, t_2, t_3>$, where $p_k$ represents a particular pattern, $s_k$ is the sequence of events that forms the pattern, $u_k$ is a list of identifiers or users having $s_k$, $c_k$ is the count of the occurrence of the pattern $p_k$ across all users or identifiers, $t_0$ is the average transition time between the first event and the last event in sequence $s_k$, $t_1$ is 25th percentile of the average transition time of the sequence $s_k$, $t_2$ is 50th percentile of the average transition time of the sequence $s_k$, and $t_3$ is 75th percentile of the average transition time of the sequence $s_k$.

The data visualization program 120 generates various visual displays of the sequential patterns and the output from the binary predictive program 114, the logistic regression program 116, and the statistics program 118.

Although FIG. 1 depicts the system and process in a particular configuration, it should be noted that the subject matter disclosed herein is not constrained to the configuration shown in FIG. 1.

Methods

Attention now turns to description of the various exemplary methods that utilize the system and device disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 2:
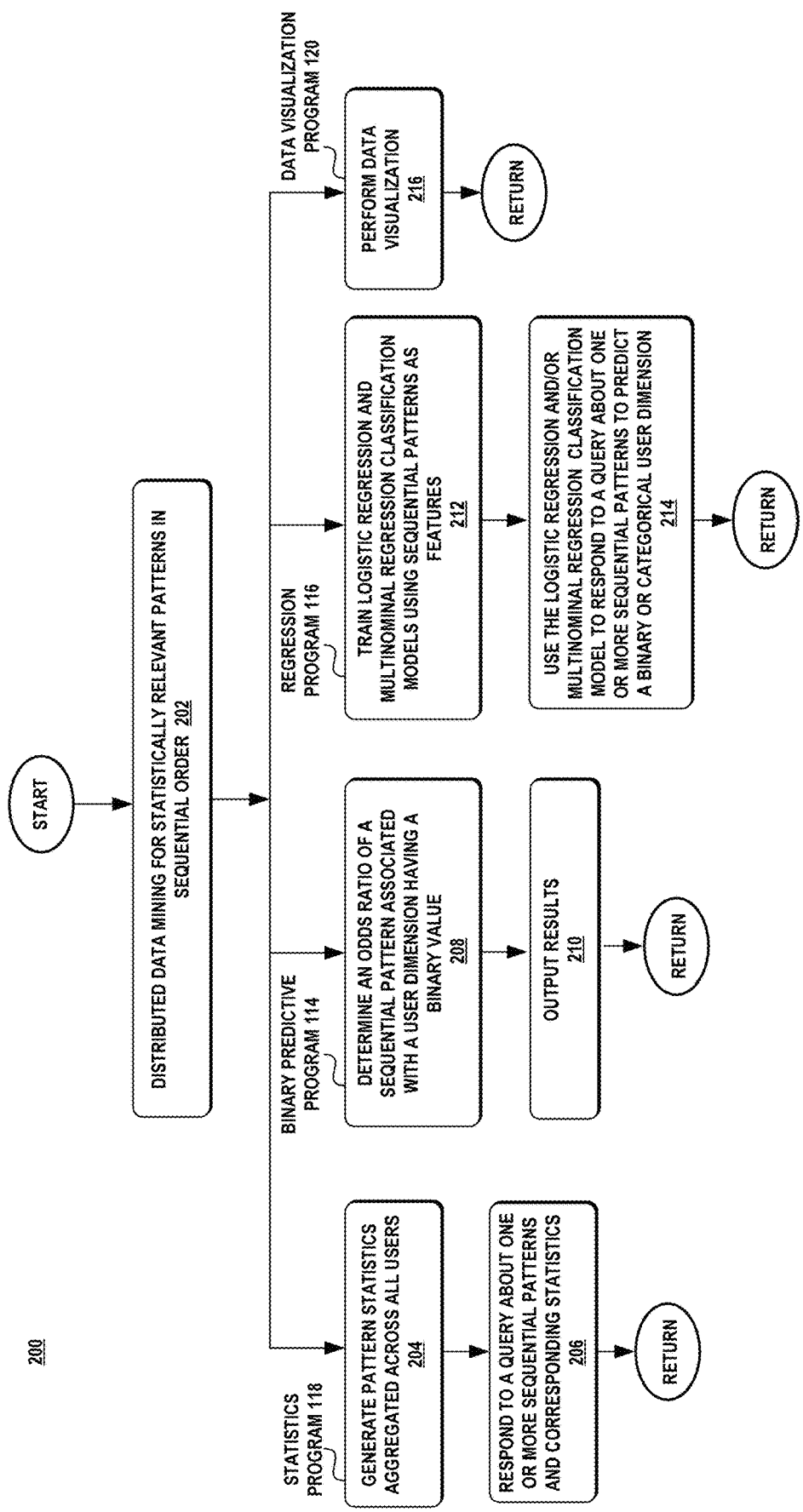
FIG. 2 is a schematic view of the operations of the distributed sequential pattern data mining framework.

FIG. 2 illustrates an exemplary method 200 performed by the data mining service. Each server of the data mining service receives event data from a specific group of end users based on an identifier and performs data mining operations to discover sequential patterns that adhere to a target objective (block 202). The sequential patterns can be analyzed by the statistics program 118 to generate statistic-based models relating to the sequential patterns from all the users (block 204). The statistic-based models are used to respond to queries about one or more sequential patterns and their usage across the user population (block 206).

In addition, the binary predictive program 114 generates an odds ratio test on a specified sequential pattern associated with a specific user dimension having a binary value (block 208) and the results are output in one or more different types of visual displays (block 210). The regression program 116 generates a logistic regression classification model and/or a multinomial regression classification model using the sequential patterns as feature vectors to train the classification models (block 212) and the output from these models are used to predict the outcome associated with a particular sequential pattern (block 214). Additionally, the data visualization program 120 generates data visualizations on various aspects of the sequential patterns (block 216).

Figure 3:
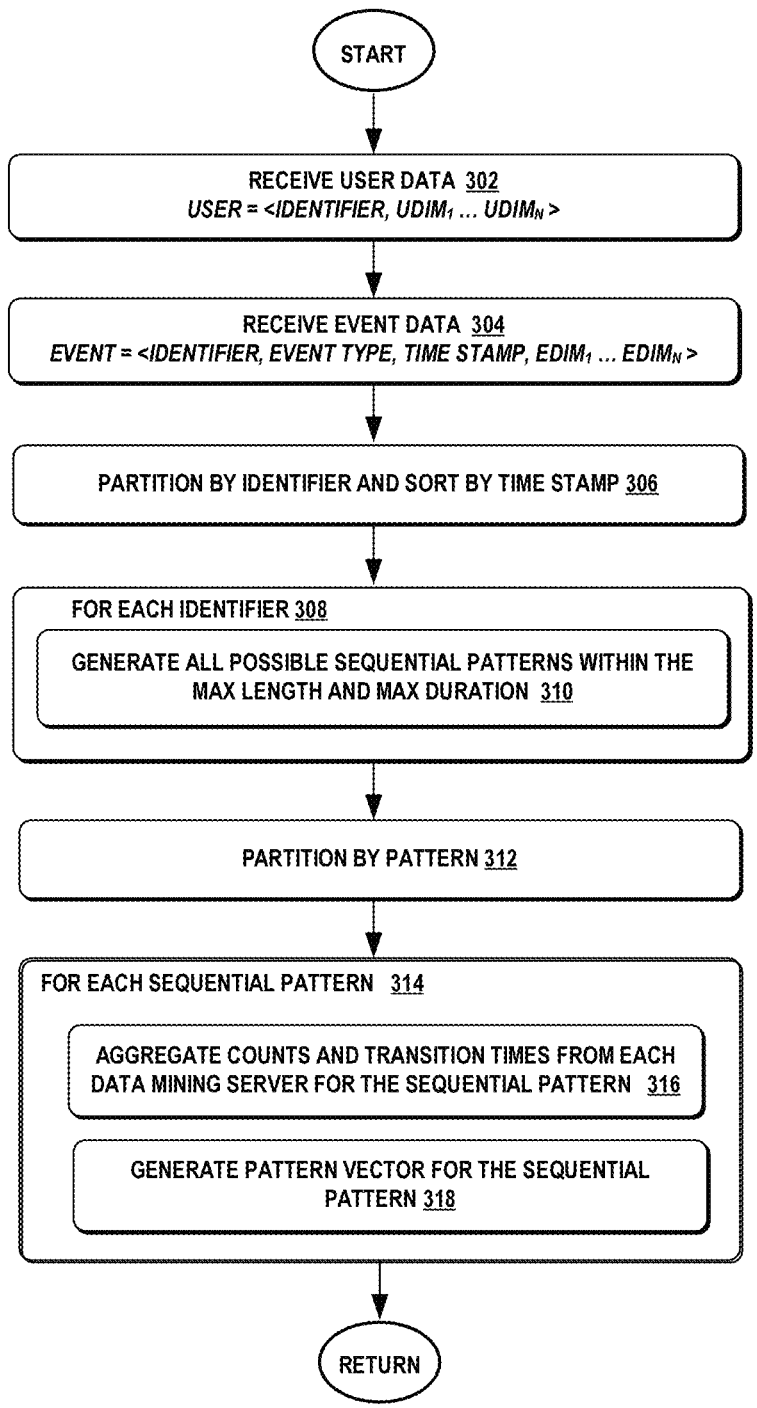
FIG. 3 is a flow diagram illustrating an exemplary method of the data mining operations that generate sequential patterns and pattern statistics.

FIG. 3 illustrates an exemplary method 300 performed by the data mining module. Each data mining module receives user data (block 302). In one aspect, the user data may be in the format <identifier, $udim_1, \ldots, udim_n$>, where identifier uniquely identifies the source of an event and $udim_1$ represents a user dimension identifying a characteristic of the user or user's usage of the software product or service.

The data mining module also receives event data from each of its respective users (block 304). In one aspect, the event data may be in the format <identifier, event type, timestamp, $edim_1, \ldots, edim_n$>, where identifier uniquely identifies the source of the event and has the same value as the identifier in the user data. The event type represents a classification of the event, the timestamp represents the time the event occurred, and $edim_i$ represents one or more event dimensions.

The data mining module groups the event data by the identifier and then within each identifier, the event data is sorted by time stamp (block 306). The event data is grouped and sorted in this manner in order to generate sequential patterns within a same identifier. A sequential pattern includes events from a single identifier in increasing chronological order.

For each identifier (block 308), all possible sequential patterns are generated within a pre-configured maximum length and time duration (block 310). The pre-configured maximum length is the maximum number of events that can be in a sequential pattern. The pre-configured time duration is the maximum amount of time that a sequential pattern can span.

The patterns are then partitioned across the different servers (block 312). This is done in order to minimize the search time for a particular pattern by storing a pattern, its sub-patterns, and pattern vector within the same server. In one aspect, the partitioning may be performed using a string hash partitioning technique.

For each pattern (block 314), a pattern vector is generated which contains statistics about the pattern (blocks 316, 318). A pattern vector, $p_k$, includes the following parameters:

$p_k = <s_k, u_k, c_k, t_0, t_1, t_2, t_3>$, where $p_k$ represents a particular pattern, $s_k$ is the sequence of events that form the pattern, $u_k$ is a list of users having $s_k$, $c_k$ is the count of the occurrence of the pattern $p_k$ across all users, $t_0$ is the average transition time between the events of $s_k$, $t_1$ is 25 percentile transition time of $s_k$, $t_2$ is 50 percentile transition time of $s_k$, and $t_3$ is 75 percentile transition time of $s_k$.

Figure 4:
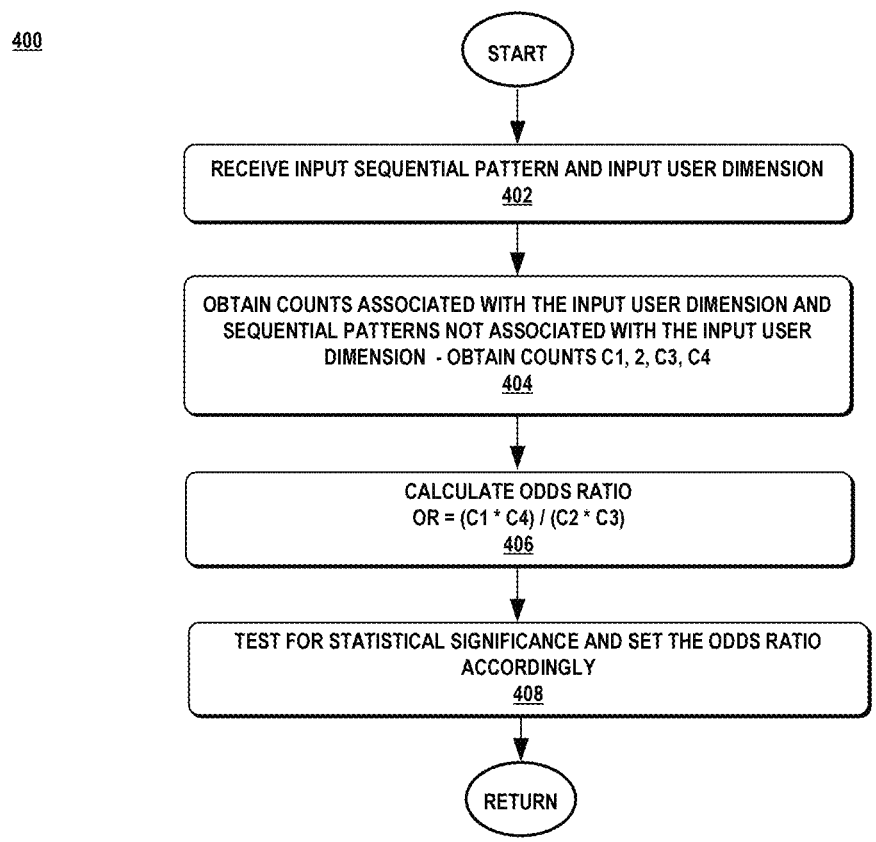
FIG. 4 is a flow diagram illustrating an exemplary method for generating a binary predictive model.

FIG. 4 illustrates an exemplary method 400 of the binary predictive program 114. The binary predictive program 114 predicts the likelihood that a particular pattern is associated with a specific outcome. The outcome is represented by a user dimension. A binary-valued user dimension represents a user dimension that has a binary value, such as on or off or "1" or "0".

The binary predictive program 114 receives an input sequential pattern and an input binary-valued user dimension (block 402). The binary predictive program 114 generates counts, C1 C2, C3, C4, needed for the odds ratio (block 404).

The binary predictive program 114 obtains the count C1 which represents the number of sequential patterns, from all users, that match the input sequential pattern and which have the user-dimension set to a binary value of "1". The count C2 represents the number of sequential patterns, from all users, that match the input sequential pattern and which have the user-dimension set to the binary value of "0". The count C3 represents the number of sequential patterns, from all users, that do not match the input sequential pattern and which have the user-dimension set to a binary value of "1". The count C4 represents the number of sequential patterns, from all users, that do not match the input sequential pattern and which have the user-dimension set to a binary value of "0" (collectively, block 404).

The odds ratio (OR) is then calculated mathematically as follows (block 406):

$$OR = \frac{C1 * C4}{C2 * C3}.$$

Next, a test is used to estimate the statistical significance of the odds ratio and to set the odds ratio based on the outcome of that test (block 408). In one aspect, a Fisher's exact test is used to test the statistical significance of the odds ratio. The Fisher's exact test generates a p-value and when the p-value is greater than a configurable threshold (0.05 is commonly applied), the odds ratio is not statistically significant and will be set to 1 by the system. When the odds ratio is set to 1, the pattern is likely to occur in both cases.

Attention now turns to a discussion of the methods of the regression program 116. In one aspect, a logistic regression model is a binary classifier that produces a discrete binary outcome of 0 or 1. Logistic regression measures the relationship between a dependent variable, such as a binary-valued user dimension, and one or more independent variables, such as the sequential patterns, by estimating probabilities using a logistic function, such as a sigmoid function. The sigmoid function takes any real-valued number and maps it into a range of 0 or 1. The values between 0 and 1 are then transformed into either 0 or 1 using a threshold classifier.

In one aspect of the disclosure, a logistic regression model is used to determine the probability of a binary-valued user dimension given a particular sequential pattern. The binary-valued user dimension may be associated with a particular outcome of a user's usage of the software product. For example, a user dimension may represent a crash having a binary value of 1 representing the occurrence of a crash and a binary value of 0 representing no occurrence of a crash. A logistic regression model is built to determine whether a crash is associated with a particular sequential pattern or not.

Turning to FIG. 5A, the regression program 116 receives input parameters used to define the sequential patterns used to train the logistic regression classifier (block 502). The input parameters identify the target sequential pattern and a target user dimension. The target sequential pattern may be represented as a regular expression that indicates the events that need to be included in a pattern and the order in which the events need to appear in the pattern. In addition, the regular expression may indicate which event dimensions and/or user dimensions need to be included in an event that is part of the target sequential pattern or excluded from an event that is part of the target sequential pattern.

For example, a target sequential pattern may be expressed as the regular expression, <event1~event2~event3>, which indicates that there are three events in the pattern and that the three events appear in the order shown in the regular expression. The target sequential pattern may also be expressed as the regular expression: <event1~*~event3>, which indicates that the target sequential pattern has event1 as the first event with the event3 as the last event, with any event between event1 and event3 by the use of the wild card character "*". The regular expression may also specify the event dimensions and/or user dimensions that need to be associated with an event that is included in the target sequential pattern. The regular expression allows for a target sequential pattern to be expressed in a variety of ways that indicate what events are included in a pattern and in what order, the events not to be included in a target sequential pattern, the user and/or event dimensions to be associated with an event, the user and/or event dimensions not to be associated with an event and so forth.

In one aspect, the logistic regression classifier is trained with all sequential patterns matching a specified user dimension (block 502). For example, if the target user dimension is "crash", then all sequential patterns associated with the user dimension of "crash" is found or joined (block 502). Feature vectors are generated from these sequential patterns and the value of the label for the classifier is the value of the target user dimension (block 504). The feature vectors and value of the user dimension is used to train the logistic regression classifier (block 506). The logistic regression classifier is tested and may be retrained until the classifier reaches a desired performance level at which time the classifier is ready for use (block 508).

FIG. 5B illustrates an exemplary method 520 of the regression program 116 to predict the value of a user dimension. The regression program 116 may receive a query that seeks to determine the likelihood of the value of a user dimension for the sequential patterns associated with a particular user (block 510). For example, the query may wish to determine if a particular sequence of events, represented by a particular sequential pattern of a user, will lead to a crash of the software product, where a crash is represented by a user dimension having a value of '1'.

The regression program 116 generates a feature vector for the target sequential pattern and inputs it into the logistic regression model (block 512). The logistic regression model outputs a value of "1" or "0" representing the predicted value of the user dimension (block 514).

Attention now turns to a description of the regression program for generating a multi-nominal regression classifier for use in predicting a categorical value of a user dimension. A multi-nominal regression classifier predicts the probability of different possible discrete outcomes of a categorically distributed dependent variable given a set of independent variables (i.e., features). The dependent variable is nominal falling into any one of a set of categories. For example, a user dimension may include a set of values that includes low, medium or high. The multi-nominal regression classifier is trained on sequential patterns associated with the categorical-valued user dimension in order to predict a categorical value (i.e., low, medium or high) for a target sequential pattern. Likewise, the multi-nominal regression model would be used to predict whether sequential patterns associated with a particular user are indicative of the user being a novice, intermediate or expert user. Another example is whether sequential patterns associated with a particular user are indicative of the user's engagement status over a period of a month which can be churned, active or deeply engaged.

Figures 6A, 6B:
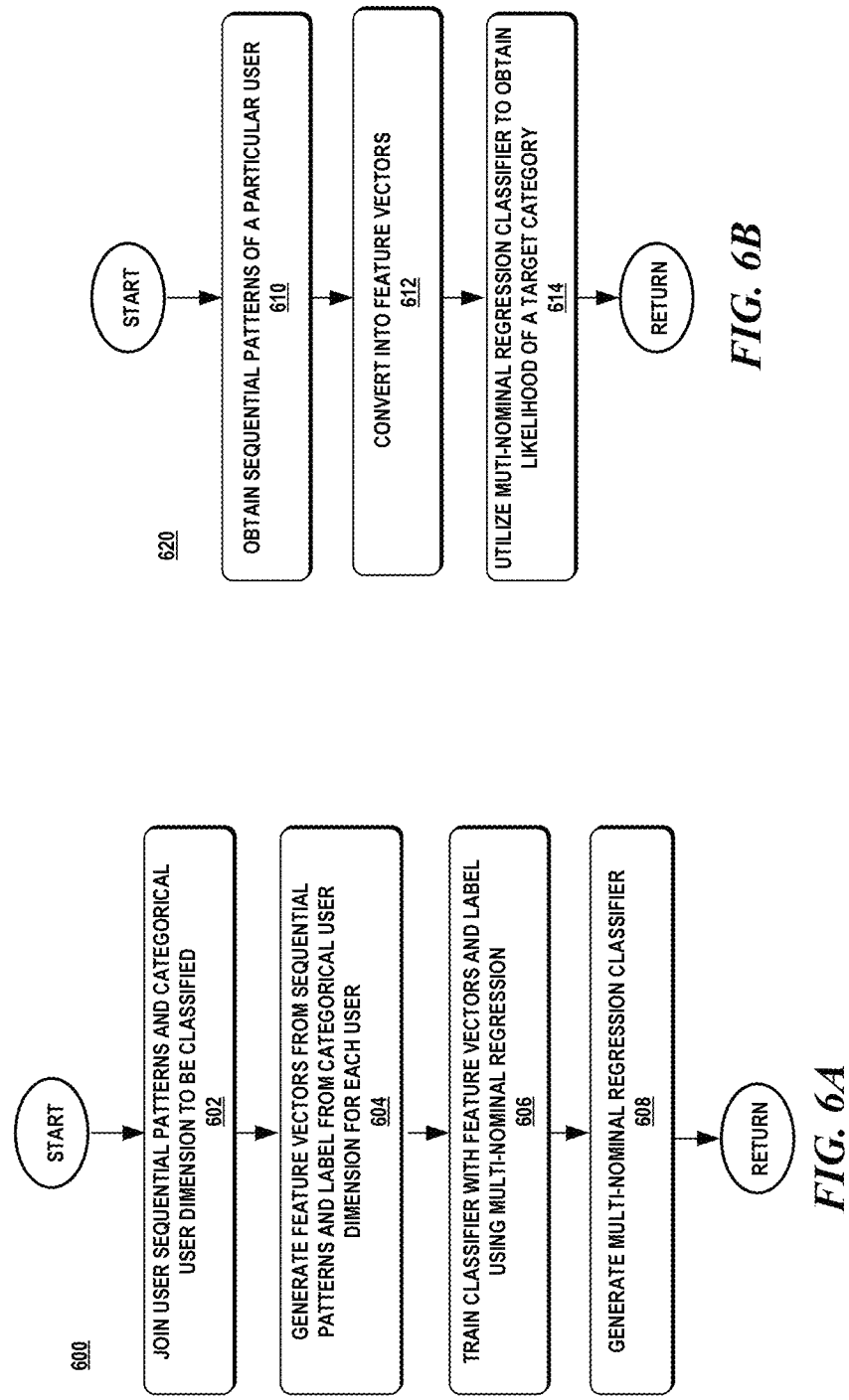
FIG. 6A is a flow diagram illustrating an exemplary method for training a multi-nominal regression classifier and FIG. 6B is a flow diagram illustrating an exemplary method of the multi-nominal regression classifier in predicting an outcome for a target sequential pattern with a categorical-valued user dimension.

Referring to FIG. 6A, the regression program 116 receives a target sequential pattern and a categorical user dimension (block 602). The regression program searches for sequential patterns matching the categorical user dimension (block 602). The sequential patterns are transformed into feature vectors and the values of the categorical user dimension are used as the labels to train a multi-nominal regression classifier (block 604). The classifier is trained and tested until it meets a desired performance threshold (block 608) at which time, the classifier is released (block 608).

Referring to FIG. 6B, the regression program receives a query concerning the sequential patterns of a particular user and a categorical user dimension (block 610). The sequential patterns are used to form feature vectors and the values of the categorical user dimension are used as the labels (block 612). The multinomial regression classifier is the used to determine the likelihood that the sequential patterns are associated with a particular value of a categorical user dimension.

Figure 7:
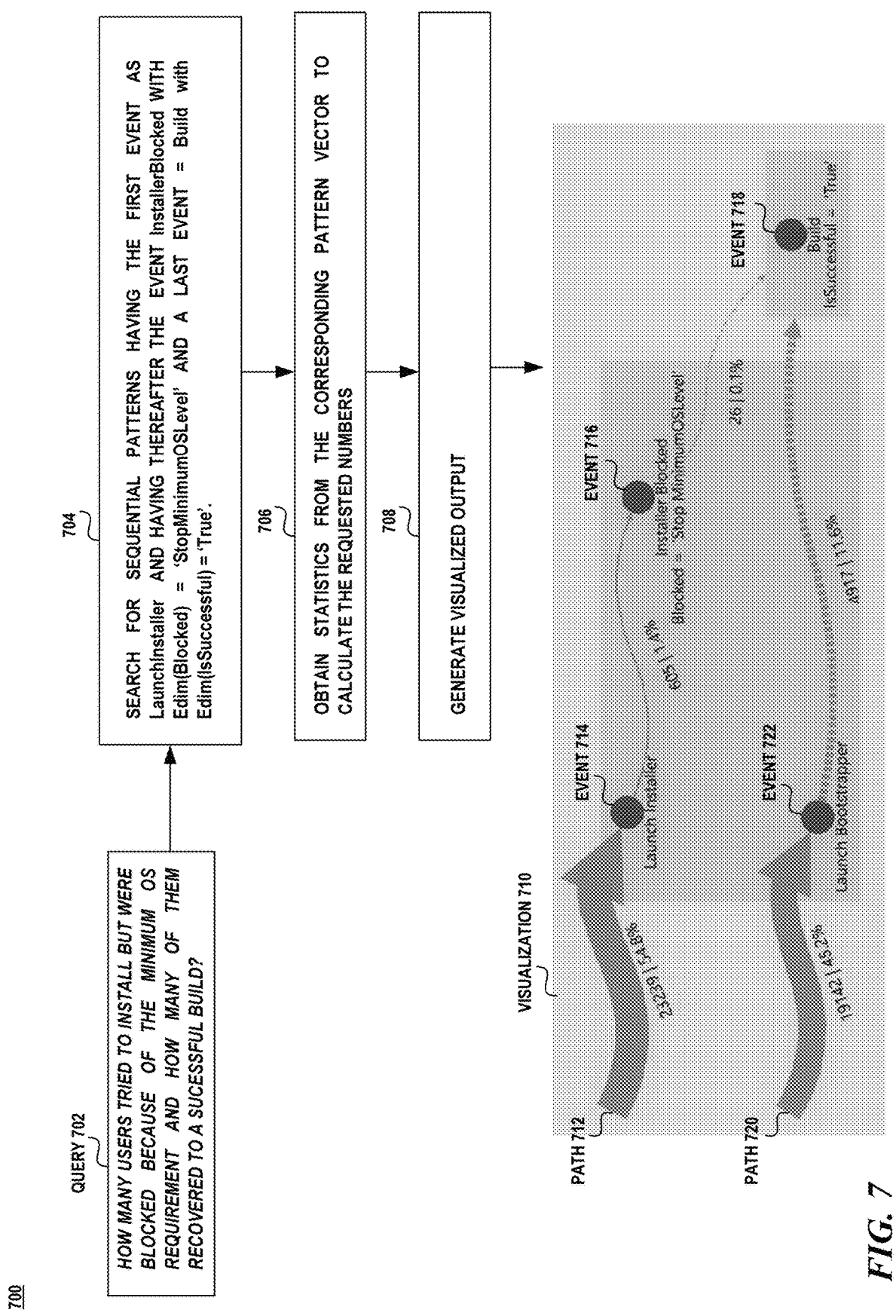
FIG. 7 is a schematic diagram illustrating a data visualization of the paths taken by a group of end users in response to a search of the mined sequential patterns.

Attention now turns to a discussion of the data visualization program. The data visualization program generates visualizations of the end user's usage of the software product through the various sequential patterns. FIG. 7 illustrates an exemplary visualization. As shown in FIG. 7, a user may submit a query 702 to determine the number of users that tried to install a software product but were blocked due to a minimum operating system requirement and how many were able to complete a successful build thereafter.

The statistics program 118 searches for sequential patterns that correspond to the query (block 704) and then obtains the requisite pattern vectors to generate the statistics needed for the response (706). The query may be transformed into a regular expression that searches for sequential patterns having as a first event "LaunchInstaller", with a subsequent event "InstallerBlocked" with an event dimension of blocked associated with "StopMinimumOSLevel", and a last event of "Build" with an event dimension of IsSuccessful having a value of True (block 706). A visualization is generated showing the output or results of the query in visualization 710 (block 708).

There is shown a path 712 of a sequential pattern having event 714 representing "Launch Installer" followed by event 716 representing "InstallerBlocked" with an event dimension of Blocked="Stop Minimum OS Level", followed by event 718 representing a successful build. The edges between each event node contains the number of users transitioning between each event and the corresponding percentage. The path 712 shows that 23,239 or 54.8% of the end users took path 712 to the first event, that only 605 or 1.4% transitioned to the InstallerBlocked event 716 and only 26 end users or 0.1% transitioned from there to a successful build ending at event 718.

Also shown in FIG. 7, is a second path 720 of a sequential pattern taken by 19,142 users or 45.2% of the end users that started at a LaunchBoostapper event 722 and then was transitioned to a successful build event at event 718 by 4,917 or 11.6% of the end users.

Technical Effect

Aspects of the subject matter disclosed herein pertain to the technical problem of predicting the factors that impact the performance of a program by evaluating the users' behavior with the program. The technical features associated with addressing this problem include mining the data into sequential patterns which are then evaluated through different tools that assist a developer to determine the sequence of events that impact the performance of the program and which can predict an outcome of the program. In this manner, those factors that negatively impact the performance of the program may be addressed before the program is released on a wide scale.

Exemplary Operating Environment

Figure 8:
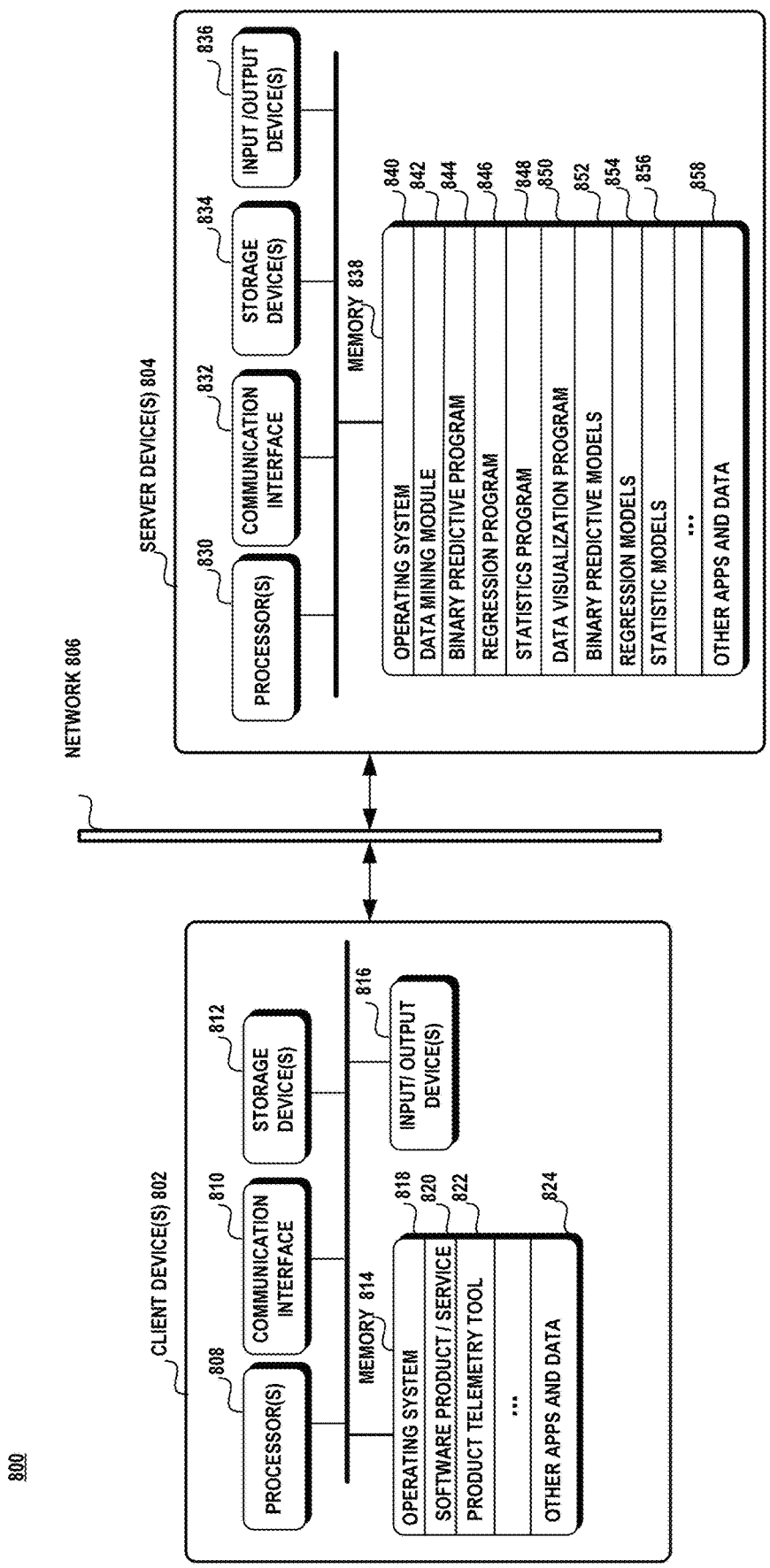
FIG. 8 is a block diagram illustrating an exemplary operating environment.

Attention now turns to FIG. 8 and a discussion of an exemplary operating environment 800. It should be noted that the operating environment 800 is exemplary and is not intended to suggest any limitation as to the functionality of the embodiments. The embodiments may be applied to an operating environment 800 having one or more client devices 802 coupled to one or more server devices 804 through network 806. The server devices 804 form a cloud service that is available on demand through the Internet.

The client devices 802 and the server devices 804 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 800 may be configured in a network environment, a distributed environment, a multi-processor environment, or a stand-alone computing device having access to remote or local storage devices.

A client device 802 may include one or more processors 808, a communication interface 810, one or more storage devices 812, a memory 814, and one or more input/output (I/O) devices 816. A processor 808 may be any commercially available processor and may include dual microprocessors and multi-processor architectures. The communication interface 810 facilitates wired or wireless communications between the client device 802 and other devices. The storage devices 812 may be computer-readable medium that do not contain propagating signals, such as modulated data signals transmitted through a carrier wave. Examples of the storage devices 812 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. The input/output (I/O) devices 816 may include a keyboard, mouse, pen, voice input device, touch input device, a display, speakers, printers, etc., and any combination thereof.

The memory 814 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. The memory 814 may also include one or more external storage devices or remotely located storage devices that do not pertain to propagated signals, such as modulated data signals transmitted through a carrier wave.

The memory 814 may contain instructions, components, modules, and data. A component is a software program that performs a specific function and is otherwise known as a module, application, and the like. The memory 814 may include an operating system 818, a software product or service under test 820, a product telemetry tool 822, and various other applications, components, and data 824. The product telemetry tool 822 may be a plug-in, extension, add-on component to the software product or service that generates the events and transmits the events to the servers.

A server device 804 also includes one or more processors 830, a communication interface 832, one or more storage devices 834, I/O devices 836, and a memory 838 as described above. The memory 838 may include an operating system 840, a data mining module 842, a binary predictive program 844, a regression program 846, a statistics program 848, a data visualization program 850, one or more binary predictive models 852, one or more regression models 854, one or more statistic models 856, and other applications and data 858.

The network 806 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Conclusion

A system is disclosed having at least one processor and a memory coupled to the at least one processor. The at least one processor is configured to: obtain a plurality of event data from at least one user during usage of an application, the event data including an event and an identifier associated with a source of the event, the event representing usage of a feature of the application by the at least one user; obtain user data from the user, the user data including the identifier; generate one or more sequential patterns using the plurality of event data and the user data, a sequential pattern representing a chronological ordering of a sequence of the events taken by the at least one user during usage of the application; and use the one or more sequential patterns to generate a binary predictive model, a statistics model or a logistic regression model, wherein the binary predictive model associates an outcome of the usage of the application with a sequence of events, the statistics model represents usage of the application, and the logistic regression model predicts outcome of usage of the application by a user.

The statistics model provides statistics for at least one of the one or more sequential patterns across all users having produced event data matching the at least one of the one or more sequential patterns, wherein the statistics include a count of users having produced event data matching the at least one of the one or more sequential patterns. The one or more sequential patterns are configured within a maximum duration and/or maximum length. The statistics include a list of users generating event data matching the at least one of the one or more sequential patterns, an average transition time between events in the at least one of the one or more sequential patterns, and transition times between events in the at least one of the one or more sequential patterns partitioned into percentile segments.

A method is disclosed that obtains a plurality of sequential patterns, a sequential pattern representing a chronological ordering of a sequence of events taken by a user during usage of an application, the user represented by a plurality of user dimensions, at least one user dimension representing an outcome of usage of the application; generates a binary predictive model for a select one of the plurality of sequential patterns based on one binary-valued user dimension; and utilizes the binary predictive model to predict an outcome of a new user having the select one of the plurality of sequential patterns.

The generation of the binary predictive model further comprises configuring an odds ratio test to determine a correlation between the select one of the plurality of sequential patterns and the outcome. The binary-valued user dimension includes a skill level of the user or an outcome associated with usage of the application. The method further comprises testing for statistical significance based on a Fisher's exact test. The method also comprises obtaining a plurality of event data and user data, the event data representing a single event, a source identifier, and a timestamp, the user data representing the source identifier; aggregating the event data by source identifier; sorting the aggregated event data by timestamp; and generating one or more sequential patterns within the sorted aggregated event data. The one or more sequential patterns generated are within a maximum length and/or maximum duration and the source identifier includes a user identifier, a session identifier, and/or an entity identifier.

A device is disclosed that includes at least one processor and a memory communicatively coupled to the least one processor. The at least one processor is configured to perform actions that: generate one or more sequential patterns using a plurality of event data, a sequential pattern representing a chronological ordering of a sequence of events taken by a plurality of users during usage of an application, the event data associated with a plurality of user dimensions; and train a regression model using select ones of the plurality of sequential patterns associated with one or more user dimensions to predict a correlation between a select sequential pattern and one or more user dimensions.

The regression model includes a binary regression model trained on select ones of the plurality of sequential patterns having binary-valued user dimensions and a multinomial regression model trained on select ones of the plurality of sequential patterns having multi-valued user dimensions. The user dimension includes an outcome resulting from usage of the application. The multi-valued user dimensions are selected based on a regular expression. The at least one processor is further configured to filter one or more of the select ones of the plurality of sequential patterns based on a criterion.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system, comprising:
   at least one processor coupled to a memory device;
   wherein the at least one processor is configured to perform acts that:
   obtain a plurality of event data from a plurality of users, each of the plurality of users executing an instance of an application, the event data including an event and an identifier associated with a source of the event, the event representing usage of a feature of the application by a user;
   obtain user data of each of the plurality of users, the user data including a plurality of user dimensions;
   generate one or more sequential patterns from the plurality of event data and the user data, a sequential pattern representing a chronological ordering of a sequence of the events taken by a user during usage of the application;
   train a binary predictive model and a logistic regression model using the one or more sequential patterns,
   wherein the binary predictive model relates a target binary-valued user dimension to a particular sequential pattern by computing an odds ratio using a number of sequential patterns from the plurality of users matching the particular sequential pattern and having a first select value for the target binary-valued user dimension and a number of sequential patterns from the plurality of users matching the particular sequential pattern and having a second select value for the target binary-valued user dimension, wherein the logistic regression model relates a binary-valued user dimension to a sequential pattern by using a logistic function to map a real-valued number into a discrete binary outcome;

correlate a target sequential pattern of a new user to a value of a binary-valued user dimension through application of the binary predictive model and/or the logistic regression model; and predict an outcome of the application by the new user from the value of the binary-valued user dimension.

2. The system of claim 1, wherein the at least one processor is configured to perform acts that:

generate a pattern vector for each of the one or more sequential patterns, the pattern vector including the sequence of events that form a sequential pattern, a list of users associated with the sequential pattern, number of occurrences of the sequential pattern across all users, average transition time between a first event and a last event in a sequence, and percentiles of the average transition time of the sequence of events.

3. The system of claim 2, wherein the at least one processor is configured to perform acts that:

obtain a user query having a plurality of events in a specified order;

search for sequential patterns that match an event of the user query in a position in the specified order;

obtain a pattern vector for each sequential pattern that corresponds to an event in the user query; and format a response to the user query using statistics obtained from the obtained pattern vectors.

4. The system of claim 1, wherein the binary-valued user dimension includes existence of a program crash, skill level of the user, and a version of the application used by the user.

5. A computer-implemented method, comprising:

obtaining a plurality of sequential patterns, a sequential pattern representing a chronological ordering of a sequence of events taken by a user, during usage of an instance of a software application, the user represented by a plurality of binary-valued user dimensions, at least one binary-valued user dimension representing an outcome of usage of the software application by the user;

training a binary predictive classifier model for each of the plurality of sequential patterns, wherein a binary predictive classifier model computes an odds ratio for a particular sequential pattern relative to a target binary-valued user dimension based on a number of the plurality of sequential patterns and a number of users having a select binary-value of the target binary-valued user dimension;

obtaining an input sequential pattern from a new user's usage of the software application and a binary-valued user dimension of the new user;

correlating an input sequential pattern of the new user to a predicted value of the binary-valued user dimension of the new user using the binary predictive classifier model; and predicting an outcome of the new user's usage of the software application from the predicted value of the binary-valued user dimension of the new user.

6. The method of claim 5, further comprising:

testing for statistical significance of a computed odds ratio based on a Fisher's exact test.

7. The method of claim 5, wherein the at least one binary-valued user dimension includes existence of a program crash or non-existence of a program crash.

8. The method of claim 5, wherein the at least one binary-valued user dimension represents a skill level of the user.

9. The method of claim 5, further comprising:

obtaining a plurality of event data and user data, the event data representing a single event, a source identifier, and a timestamp, the user data representing the source identifier;

aggregating the event data by source identifier;

sorting the aggregated event data by timestamp; and generating one or more sequential patterns within the sorted aggregated event data.

10. The method of claim 9, wherein the one or more sequential patterns generated are within a maximum length and/or maximum duration.

11. The method of claim 9, wherein the source identifier includes a user identifier, a session identifier, and/or an entity identifier.

12. A device, comprising:

at least one processor and a memory communicatively coupled to the least one processor;

wherein the at least one processor is configured to perform actions that:

generate a plurality of sequential patterns from a plurality of event data and user data, a sequential pattern representing a chronological ordering of a sequence of events taken by a plurality of users during usage of an application, the user data having a plurality of user dimensions;

train a logistics regression classifier to relate a binary-valued user dimension to a target sequential pattern by estimating probabilities with a logistic function to map a real-valued number into a discrete binary outcome, wherein the logistics regression classifier is trained with sequential patterns associated with a target binary-valued user dimension;

correlate a sequential pattern of a new user of the application to a value of a target binary-valued user dimension through application of the logistics regression classifier; and predict an outcome of usage of the application from the predicted value of the target binary-valued user dimension.

13. The device of claim 12, wherein the target binary-valued user dimension pertains to a skill level of a user or version of the application used by a user.

14. The device of claim 12, wherein the at least one processor is configured to perform actions that:

train a multi-nominal regression classifier to relate categorical-valued user dimensions to target sequential patterns.

15. The device of claim 14, wherein the at least one processor is configured to perform actions that:

utilize the multi-nominal regression classifier to predict a categorical value of a target categorical-valued user dimension.

16. The device of claim 15, wherein the target categorical-valued user dimension includes user experience level with the application or different outcomes of the application.

* * * * *